(12) United States Patent
Polyakov

(10) Patent No.: US 11,332,635 B1
(45) Date of Patent: May 17, 2022

(54) PROTECTIVE HEAT-RESISTANT COATING COMPOSITIONS

(71) Applicant: PIPL LIMITED, Nicosia (CY)

(72) Inventor: Maxym Polyakov, Edinburgh (GB)

(73) Assignee: PIPL LIMITED, Nicosia (CY)

( * ) Notice: Subject to any disclaimer, the term of this patent is extended or adjusted under 35 U.S.C. 154(b) by 0 days.

(21) Appl. No.: 17/554,382

(22) Filed: Dec. 17, 2021

(51) Int. Cl.
*C09D 129/04* (2006.01)
*B05D 7/00* (2006.01)
*C08K 13/02* (2006.01)

(52) U.S. Cl.
CPC ........... *C09D 129/04* (2013.01); *B05D 7/584* (2013.01); *C08K 13/02* (2013.01)

(58) Field of Classification Search
CPC ....... B05D 7/584; C09D 129/04; C08K 13/02
See application file for complete search history.

(56) References Cited

FOREIGN PATENT DOCUMENTS

JP          62184066 A  *  8/1987

OTHER PUBLICATIONS

Machine translation of JP-62184066-A (Year: 1987).*

* cited by examiner

*Primary Examiner* — Wenwen Cai
(74) *Attorney, Agent, or Firm* — Georgiy L. Khayet

(57) ABSTRACT

A method for heat-resistant protection of machinery components made of metal alloy is provided. The method includes preparing a surface of the machinery component to remove impurities, applying at least one layer of a coating composition to the surface of the machinery component, and drying the layer prior to applying a next layer of the coating composition to the surface. The coating composition includes a clay deposit, a polyvinyl alcohol solution, a distilled water, and a mixture including, by weight, from 40% to 60% of nickel, from 5% to 7% of chromium, from 12% to 15% of silicon, from 6% to 8% of titanium diboride, from 3% to 13% of barium oxide, from 1% to 10% of boron oxide, and from 4% to 6% by weight of silicon oxide, up to 2% of molybdenum disilicide, up to 5% of zinc oxide, and up to 2% of magnesium oxide.

17 Claims, 2 Drawing Sheets

PROTECTIVE HEAT-RESISTANT COATING COMPOSITIONS

TECHNICAL FIELD

This disclosure generally relates to methods for protection of machinery components from heat. More particularly, this disclosure relates to protective heat-resistance coating compositions applied to machinery components made of metal alloys.

BACKGROUND

Machinery components of rocket engines operate in harsh environments. The harsh environments may include extreme temperatures spanning in range from a few hundred degrees below the freezing point to nearly thousand degrees above the freezing point in presence of active chemical compounds, such as oxygen. Machinery components are typically made of metal alloys. Therefore, in harsh environments, the machinery components may degrade due to gas corrosion and temperature deformation. Accordingly, machinery components needed to be protected from the gas corrosion and temperature deformation.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

This disclosure relates to heat-resistant protection of machinery components used in rocket technology, such as machinery components of turbines installed in rocket engines.

According to some embodiments of the disclosure, a method for heat-resistant protection of a machinery component can include preparing a surface of the machinery component to remove impurities, applying at least one layer of a coating composition to the surface of the machinery component, and drying the layer prior to applying the next layer of the coating composition to the surface.

The preparation of the surface of the machinery component can include sandblasting the surface using a fused corundum and degreasing the surface with an isopropyl alcohol.

The coating composition may include a clay deposit, a polyvinyl alcohol solution, a distilled water, and a mixture. The mixture may include from 40% to 60% by weight of nickel, from 5% to 7% by weight of chromium, from 12% to 15% by weight of silicon, from 6% to 8% by weight of titanium diboride, from 3% to 13% by weight of barium oxide, from 1% to 10% by weight of boron oxide, and from 4% to 6% by weight of silicon oxide. Additionally, the mixture may include one or more of the following: up to 2% by weight of molybdenum disilicide, up to 5% by weight of zinc oxide, and up to 2% by weight of magnesium oxide. The weight of the clay in the coating composition can be from 3% to 6% of the weight of the mixture. The weight of the polyvinyl alcohol solution in the coating composition can be up to 4% of the weight of the mixture. The weight of the distilled water in the coating composition can be from 50% to 70% of the weight of the mixture. The clay deposit may include a Chasov-Yar clay deposit.

The layer of the coating composition can be applied to the surface of the machinery components by one of the following: pouring the coating composition on the surface of the machinery component, dipping the machinery component into the coating composition, or spraying the coating composition onto the surface. A grinding fineness of a slip made of the coating composition can be adjusted to allow passing the slip through a sieve having a cell diameter between 0.056 millimeters and 0.063 millimeters.

At least the first layer, the second layer, and the third layer of the coating composition can be applied to the surface of the machinery component. The second layer is applied after the first layer and the third layer is applied after the second layer. The thickness of the first layer can be between 20 micrometers and 80 micrometers. The sum of thicknesses of the first layer and the second layer can be between 60 and 160 micrometers. The sum of thicknesses of the first layer, the second layer, and the third layer can be between 100 and 240 micrometers. A covering power of the covering composition can be between 0.012 gram per square centimeter ($g/cm^2$) and 0.016 $g/cm^2$.

Each of the first layer, the second layer and the third layer can be dried in open air at a temperature 25±5 degrees Celsius and then in a drying oven at a temperature of 80±10 degrees Celsius for a first predetermined time. The first predetermined time can be at least one hour.

After being dried, each of the first layer, the second layer and the second layer can be burned at a temperature of 850 degrees Celsius for a second predetermined time. The first layer can be burned for one hour, the second layer can be burned for half an hour, and the third layer can be burned for half an hour.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF EXAMPLE EMBODIMENTS

Figure 1:
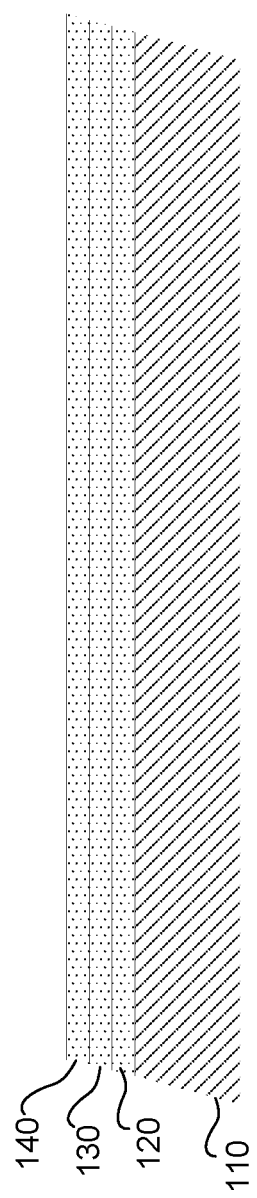
FIG. 1 is a schematic showing a machinery component covered with layers of heat-resistant coating component.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Generally, the embodiments of this disclosure are concerned with methods for heat-resistant protection of machinery components. Embodiments of the present disclosure may provide heat-resistant coating compositions for protection of machine components used in rocket engines. Specifically, heat-resistant coating compositions disclosed herein can be applied to a rotor, a stator, and an exhaust manifold of a turbine. The heat-resistant coating compositions can protect the machine components against combustion and high-temperature gas metal erosion in the environment of high-pressure and high-temperature oxygen.

The main advantages of the protective heat-resistant coatings disclosed herein is that they may provide resistance to almost all corrosive media. The protective heat-resistant coatings disclosed herein possess high strength, wear resistance, hardness, and stability of mechanical properties within a wide temperature range. Accordingly, the heat-resistant coating compositions may help to extend an operating temperature range of the rocket engines and therefore increase the power and efficiency of the rocket engines.

According to embodiments of the present disclosure, a coating composition for heat-resistant protection of a machinery component made of a chromium-nickel alloy is provided. The coating composition may include a clay deposit, a polyvinyl alcohol solution, a distilled water, and a mixture. The mixture may include from 40% to 60% by weight of nickel, from 5% to 7% by weight of chromium, from 12% to 15% by weight of silicon, from 6% to 8% by weight of titanium diboride, from 3% to 13% by weight of barium oxide, from 1% to 10% by weight of boron oxide, and from 4% to 6% by weight of silicon oxide. The mixture may further include from 0% to 2% by weight of molybdenum disilicide, from 0% to 5% by weight of zinc oxide, and from 0% to 2% by weight of magnesium oxide. The weight of the clay can be from 3% to 6% in addition to the weight of the mixture, the weight of the polyvinyl alcohol solution can be up to 4% in addition to the weight of the mixture, and the weight of the distilled water can be from 50% to 70% in addition to the weight of the mixture. The clay deposit includes a Chasov-Yar clay deposit.

FIG. 1 is a schematic showing a machinery component 110 covered with layers 120, 130, and 140 of a heat-resistant coating component. The machinery component 110 can be made of metal alloys, for example chromium-nickel alloys. The heat-resistant coating component may include, by weights percentages: 40-60% of nickel, 5-7% of chromium, 12-15% of silicon, 6-8% of titanium diboride, 0-2% of molybdenum disilicide, 3-13% of barium oxide, 0-5% of zinc oxide, 0-2% of magnesium oxide, 1-10% of boron oxide, and 4-6% of silicon oxide. The heat-resistant coating component may include the following components above 100%: 3-6% of clay from Chasov-Yar clay deposit, up to 4% of polyvinyl alcohol solution, and 50-70% of distilled water.

Before applying a slip made of the coating composition, the surface of machinery component 110 is prepared by sandblasting with fused corundum and then degreased with isopropyl alcohol. Layers of the coating composition can be applied onto the surface by pouring, dipping, and spraying. To obtain a high-quality metal-ceramic coating, the grinding fineness of the slip shall ensure the passing of the slip through a sieve having a cell diameter between 0.056 millimeters and 0.063 millimeters.

After being applied, each of the layers 120, 130, and 140 can be dried. Drying can be carried out in the open air at a temperature of 25±5 degrees of Celsius following by drying in a drying oven at a temperature of 80±10 degrees of Celsius for one hour. Then, each of the layers can be burned at a temperature of 850 degrees of Celsius in an oxidizing environment directly on the surface of the protected machinery component. The burning time of the first coating layer 120 can be one hour, the burning time of the second coating layer 130 can be a half an hour, and the burning time of the third coating layer can be also half an hour.

The thickness of the first coating layer 120 can be 20-80 microns at a covering power of 0.012-0.016 gram per square centimeter ($g/cm^2$). The total thickness of the first layer 120 and the second layer 130 can be 60-160 microns and the total thickness of the first layer 120, the second layer 130 and the third layer 140 can be 100-240 microns. The whole coating including the layers 120, 130, and 140 is characterized by uniform high-quality adhesion to metal and good interlayer connectivity.

According to experimental results carried out by the inventor, sample metal components covered with a three-layer coating and dried in open air only can withstand 40 thermal cycles from 950 to 20 degrees of Celsius without destruction. The operating temperature range of the protective heat-resistant coating can be from −183 to +1000 degrees of Celsius. The protective heat-resistant coating is also resistant to vibration loads and gas corrosion.

Figure 2:
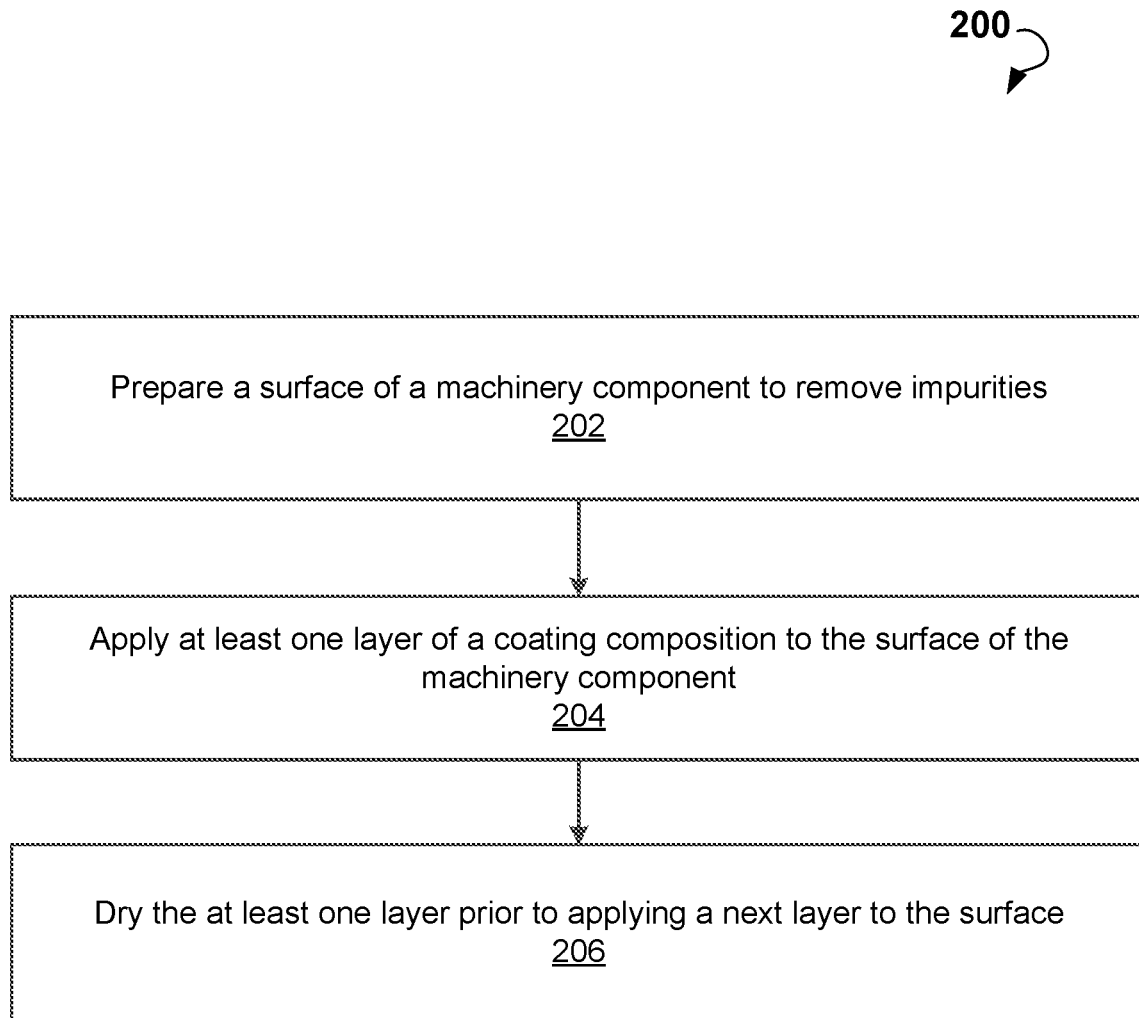
FIG. 2 is a flow chart of a method for heat-resistant protection of a machinery component made of metal alloy, according to some example embodiments.

FIG. 2 is a flow chart of a method 200 for heat-resistant protection of a machinery component made of a metal alloy, according to some example embodiments. The machinery component can be made of a chromium-nickel alloy. The machinery component may include one of the following: a rotor of a turbine, a stator of the turbine, and an exhaust manifold of the turbine. The turbine can be designed to be installed on a rocket engine.

The method 200 may commence in block 202, with preparation of a surface of the machinery component to remove impurities. The preparation of the surface of the machinery component may include sandblasting the surface with a fused corundum and degreasing the surface with an isopropyl alcohol.

In block 204, the method 200 may proceed with applying at least one layer of a coating composition to the surface of the machinery component. The coating composition may include a clay deposit, a polyvinyl alcohol solution, a distilled water, and a mixture. The mixture may include from 40% to 60% by weight of nickel, from 5% to 7% by weight of chromium, from 12% to 15% by weight of silicon, from 6% to 8% by weight of titanium diboride, from 3% to 13% by weight of barium oxide, from 1% to 10% by weight of boron oxide, and from 4% to 6% by weight of silicon oxide. Additionally, the mixture may include one or more of the following: up to 2% by weight of molybdenum disilicide, up to 5% by weight of zinc oxide, and up to 2% by weight of magnesium oxide. The weight of the clay in the coating composition can be from 3% to 6% of the weight of the mixture. The weight of the polyvinyl alcohol solution in the coating composition can be up to 4% of the weight of the mixture. The weight of the distilled water in the coating composition can be from 50% to 70% of the weight of the mixture. The clay deposit may include Chasov-Yar clay deposit.

The layer of the coating composition can be applied to the surface of the machinery components by one of the following: pouring the coating composition onto the surface of the machinery component, dipping the machinery component into the coating composition, or spraying the coating composition onto the surface. A grinding fineness of a slip made of the coating composition can be adjusted to allow passing the slip through a sieve having a cell diameter between 0.056 millimeters and 0.063 millimeters. In block 206, the method 200 may include drying the layer prior to applying a next layer of the coating composition to the surface.

In certain embodiments, at least the first layer, the second layer, and the third layer of the coating composition can be applied to the surface of the machinery component. The second layer is applied after the first layer and the third layer is applied after the second layer. The thickness of the first layer can be between 20 micrometers and 80 micrometers. The sum of thickness of the first layer and thickness of the second layer can be between 60 and 160 micrometers. The sum of thickness of the first layer, thickness of the second layer, and thickness of the third layer can be between 100 and 240 micrometers. A covering power of the covering composition can be between 0.012 gram per square centimeter ($g/cm^2$) to 0.016 $g/cm^2$.

Each of the first layer, the second layer, and the third layer can be dried in open air at a temperature 25±5 degrees Celsius and then in a drying oven at a temperature 80±10 degrees Celsius for a first predetermined time. The first predetermined time can be at least one hour.

After being dried, each of the first layer, the second layer and the third layer can be burned at a temperature of 850 degrees Celsius for a second predetermined time. The first layer can be burned for one hour, the second layer can be burned for half an hour, and the third layer can be burned for half an hour.

Thus, methods for heat-resistant protection of machinery components made of a metal alloy are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A method for heat-resistant protection of a machinery component made of metal alloy, the method comprising:
   preparing a surface of the machinery component to remove impurities;
   applying at least one layer of a coating composition to the surface of the machinery component, wherein:
      the coating composition includes a clay deposit, a polyvinyl alcohol solution, a distilled water, and a mixture including:
         from 40% to 60% by weight of nickel;
         from 5% to 7% by weight of chromium;
         from 12% to 15% by weight of silicon;
         from 6% to 8% by weight of titanium diboride;
         from 3% to 13% by weight of barium oxide;
         from 1% to 10% by weight of boron oxide; and
         from 4% to 6% by weight of silicon oxide; and
      wherein:
         the weight of the clay deposit is from 3% to 6% of the weight of the mixture;
         the weight of the polyvinyl alcohol solution is up to 4% of the weight of the mixture; and
         the weight of the distilled water, is from 50% to 70% of the weight of the mixture; and
      drying the at least one layer prior to applying a next layer of the coating composition to the surface.

2. The method of claim 1, wherein the mixture further includes one or more of the following:
   up to 2% by weight of molybdenum disilicide;
   up to 5% by weight of zinc oxide; and
   up to 2% by weight of magnesium oxide.

3. The method of claim 1, wherein the machinery component is made of a chromium-nickel alloy.

4. The method of claim 1, wherein the machinery component includes one of the following: a rotor of a turbine, a stator of the turbine, and an exhaust manifold of the turbine.

5. The method of claim 4, wherein the turbine is designed to be installed on a rocket engine.

6. The method of claim 1, wherein preparing the surface of the machinery component includes one or more of the following:
   sandblasting the surface using a fused corundum; and
   degreasing the surface with an isopropyl alcohol.

7. The method of claim 1, wherein the applying the at least one layer of the coating composition includes one or more of the following:
   pouring the coating composition on the surface of the machinery component;
   dipping the machinery component into the coating composition; and
   spraying the coating composition onto the surface.

8. The method of claim 7, wherein a grinding fineness of a slip made of the coating composition is adjusted to allow passing the slip through a sieve having a cell diameter between 0.056 millimeters and 0.063 millimeters.

9. The method of claim 1, wherein the at least one layer includes a first layer, a second layer, and a third layer, wherein the second layer is applied after the first layer and the third layer is applied after the second layer.

10. The method of claim 9, wherein:
    the thickness of the first layer is between 20 micrometers and 80 micrometers;
    a sum of the thickness of the first layer and the thickness of the second layer is between 60 and 160 micrometers; and
    a sum of the thickness of the first layer, the thickness of the second layer, and the thickness of the third layer is between 100 and 240 micrometers.

11. The method of claim 9, wherein:
    each of the first layer, the second layer and the third layer are being dried using the following:
       open air at a temperature 25±5 degrees Celsius; and
       a drying oven at a temperature 80±10 degrees Celsius for a first predetermined time; and
    wherein after being dried, each of the first layer, the second layer and the third layer is burned at a temperature of 850 degrees Celsius for a second predetermined time.

12. The method of claim 11, wherein the first predetermined time is at least one hour.

13. The method of claim 12, wherein:
    the first layer is being burned for one hour;
    the second layer is being burned for half an hour; and
    the third layer is being burned for half an hour.

14. A coating composition for heat-resistant protection of a machinery component made of a chromium-nickel alloy, the coating composition comprising a clay deposit, a polyvinyl alcohol solution, a distilled water, and a mixture, wherein the mixture includes:
- from 40% to 60% by weight of nickel;
- from 5% to 7% by weight of chromium;
- from 12% to 15% by weight of silicon;
- from 6% to 8% by weight of titanium diboride;
- from 3% to 13% by weight of barium oxide;
- from 1% to 10% by weight of boron oxide; and
- from 4% to 6% by weight of silicon oxide; and wherein:
- the weight of the clay deposit is from 3% to 6% of the weight of the mixture;
- the weight of the polyvinyl alcohol solution is up to 4% of the weight of the mixture; and
- the weight of the distilled water; is from 50% to 70% of the weight of the mixture.

15. The coating composition claim 14, wherein the mixture further includes up to 2% by weight of molybdenum disilicide.

16. The coating composition claim 14, wherein the mixture further includes up to 5% by weight of zinc oxide.

17. The coating composition claim 14, wherein the mixture further includes up to 2% by weight of magnesium oxide.

\* \* \* \* \*